(12) United States Patent  (10) Patent No.: US 7,487,036 B2
Kim  (45) Date of Patent: Feb. 3, 2009

(54) SYSTEM FOR INDICATING, RECORDING AND EVALUATING DRIVING DATA MODE OF VEHICLE FOR FUEL ECONOMY

(76) Inventor: Jong Sig Kim, 104-701, Dongil Apt., 658 Mandeok, 1-dong, Buk-gu, Busan 616-755 (KR)

( * ) Notice: Subject to any disclaimer, the term of this patent is extended or adjusted under 35 U.S.C. 154(b) by 534 days.

(21) Appl. No.: 10/545,327

(22) PCT Filed: Feb. 6, 2004

(86) PCT No.: PCT/KR2004/000228

§ 371 (c)(1),
(2), (4) Date: Feb. 7, 2006

(87) PCT Pub. No.: WO2004/070708

PCT Pub. Date: Aug. 19, 2004

(65) Prior Publication Data

US 2006/0142934 A1    Jun. 29, 2006

(30) Foreign Application Priority Data

Feb. 10, 2003  (KR) .................... 10-2003-00008383

(51) Int. Cl.
*G01F 9/02*  (2006.01)
*G01C 21/20*  (2006.01)
*G06F 19/00*  (2006.01)

(52) U.S. Cl. .................. 701/123; 701/35; 701/213; 702/182

(58) Field of Classification Search ............... 701/1, 701/29, 35, 123, 213, 103, 104; 123/467; 73/861.03; 702/100, 149, 156, 182, 183, 702/184, 187
See application file for complete search history.

(56) References Cited

U.S. PATENT DOCUMENTS 5,301,113 A * 4/1994 To et al. ............... 701/123
6,044,315 A * 3/2000 Honeck et al. .......... 701/35
6,484,088 B1 * 11/2002 Reimer ................ 701/123
2004/0098190 A1 * 5/2004 Nakayama et al. ....... 701/104

FOREIGN PATENT DOCUMENTS

JP  2002-370560  12/2002

* cited by examiner

*Primary Examiner*—Tan Q Nguyen
(74) *Attorney, Agent, or Firm*—TIPS Group

(57) ABSTRACT

A system for indicating, recording and evaluating a driving-data mode under three conditions of acceleration, speed maintenance and deceleration, in which the evaluated results are displayed on an LCD so that the vehicle is driven at a ¾ point of engine load capacity, serving as an acceleration point representing the maximum efficiency in designing a vehicle engine, at a ⅕ point of engine load capacity, serving as a static load point, and at a fuel-cutting point, thereby allowing the vehicle to be driven at the maximum efficiency point and maximizing a fuel efficiency. The system includes a fuel-injection amount-detecting unit, a maximum point-assigning unit, an engine idle driving fuel-injection amount driving point-assigning unit, ¾ and ⅕ point-assigning units, a fuel-injection amount cutting point-assigning unit, a fuel-injection amount display-indicating unit, a fuel-injection amount graph-regulating unit, and a liquid crystal display unit.

8 Claims, 2 Drawing Sheets

SYSTEM FOR INDICATING, RECORDING AND EVALUATING DRIVING DATA MODE OF VEHICLE FOR FUEL ECONOMY

TECHNICAL FIELD

The present invention relates to a system for utilizing a driving-data mode of a vehicle for maximizing a fuel efficiency of the vehicle by means of an electronic control unit (ECU), and more particularly to a system which allows a driver to indicate, record and evaluate a driving-data mode of a vehicle under three conditions, acceleration (an upward slope), speed maintenance (a flat land) and deceleration (a downward slope), and displays the evaluated results on a liquid crystal display (LCD) unit so that the vehicle is driven at a ¾ point of engine load capacity, serving as an acceleration point representing the maximum efficiency considered in designing a vehicle engine, at a ⅕ point of engine load capacity, serving as a static load point, and at a fuel-cutting point, thereby allowing the vehicle to be driven at the maximum point and thus maximizing a fuel efficiency.

BACKGROUND ART

Generally, a speedometer or a RPM(Revolutions Per Minute) meter is used to evaluate economic driving, which is considered as a standard for driving a vehicle. It is difficult to use the trip computer as a standard for improving fuel efficiency because a trip computer employed by some kinds of vehicles informs a driver of driving results obtained by computing a fuel consumption rate and a driving distance. Therefore, it causes fuel to be excessively lost, generates a large quantity of smoke, shortens the life span of the vehicle, and depreciates the performance of an engine of the vehicle.

DISCLOSURE OF INVENTION

Technical Problem

Therefore, the present invention has been made in view of the above problems, and it is an object of the present invention to provide a system for indicating, recording and evaluating a driving-data mode of a vehicle, in which an analog signal value being generated from an electronic control unit and determining a fuel-injection amount is converted into a digital signal value, and the obtained results are displayed on a liquid crystal display unit, thereby allowing a driver to sense ¾ and ⅕ points of engine load capacity and a fuel-cutting point, and thus maximizing efficiency in fuel consumption.

It is another object of the present invention to provide a system for indicating, recording and evaluating a driving-data mode of a vehicle, which prevents a driver from driving the vehicle at a point having low efficiency in fuel consumption, thereby allowing the driver to drive the vehicle in the maximum fuel efficiency and fuel of the vehicle to be efficiently consumed.

Technical Solution

In accordance with the present invention, the above and other objects can be accomplished by the provision of a system for indicating, recording and evaluating a driving-data mode of a vehicle for fuel economy, comprising: a fuel-injection amount-detecting unit for detecting a digital signal converted from an analog signal determining a fuel-injection amount; a maximum point-assigning unit for assigning the maximum point of the fuel-injection amount; an engine idle driving fuel-injection amount driving point-assigning unit for assigning a driving point having a fuel-injection amount for engine idle driving; a ¾ point-assigning unit for assigning a point to be ¾ of a distance from the driving point having the fuel-injection amount for engine idle driving to the maximum point of the fuel-injection amount; a ⅕ point-assigning unit for assigning a point to be ⅕ of the distance from the driving point having the fuel-injection amount for engine idle driving to the maximum point of the fuel-injection amount; a fuel-injection amount cutting point-assigning unit for assigning a point for cutting off the fuel-injection amount; a fuel-injection amount display-indicating unit for indicating the display of the fuel-injection amount and recording the display for a designated period; a fuel-injection amount graph-regulating unit for finely regulating a graph illustrating the fuel-injection amount; and a liquid crystal display unit for displaying obtained results, wherein variables of the assigning units are set.

Preferably, the liquid crystal display unit may display a fixed standard point of the maximum fuel-injection amount; a ¾ point, finely adjustable in a vertical direction; a point for indicating the display of the fuel-injection amount and generating the record of the fuel-injection amount; a ⅕ point, finely adjustable in a vertical direction; a fixed standard point of the fuel-injection amount for engine idle driving; a standard point for cutting off the fuel injection; a point for terminating the record of the fuel-injection amount; and a graph for illustrating the record of the fuel-injection amount and evaluating the application of the record to a driving mode, wherein coordinate axes of the graph denote the time and the fuel-injection amount.

Further, preferably, in the graph for illustrating the record of the fuel-injection amount and evaluating the application of the record to the driving mode, displayed by the liquid crystal display unit, the fixed standard point of the maximum fuel-injection amount may not coincide with a point of the maximum fuel-injection amount of the engine; the fixed standard point of the fuel-injection amount for the engine idle driving may not coincide with a point of the fuel-injection amount for the engine idle driving; and the standard point for cutting off the fuel injection may coincide with a point for cutting off the fuel injection of the engine.

Moreover, preferably, in the graph for illustrating the record of the fuel-injection amount and evaluating the application of the record to the driving mode, displayed by the liquid crystal display unit, the fixed standard point of the maximum fuel-injection amount may coincide with a point of the maximum fuel-injection amount of the engine; the fixed standard point of the fuel-injection amount for the engine idle driving may coincide with a point of the fuel-injection amount for the engine idle driving; and the standard point for cutting off the fuel injection may coincide with a point for cutting off the fuel injection of the engine so that the system precisely detects ¾ and ⅕ load capacities of the engine and precisely cuts off the fuel.

Preferably, it may be evaluated whether or not the driving mode is applied by indicating the fuel-injection amount, generated by starting the engine, in a coordinate direction at the point for indicating the display of the fuel-injection amount and generating the record of the fuel-injection amount in the graph, for illustrating the record of the fuel-injection amount and evaluating the application of the record to the driving mode, displayed by the liquid crystal display unit, by schematizing the record of the fuel-injection amount along a shift direction of the graph for a designated period, and by maintaining the record up to the point for terminating the record of the fuel-injection amount.

Further, preferably, the driving mode may be applied to the ¾ point of the engine load capacity, the ⅕ point of the engine load capacity, and the point for cutting off the fuel, thereby increasing efficiency in fuel consumption.

Moreover, preferably, the ¾ point and the ⅕ point of the liquid crystal display unit serving as an acceleration point and a speed maintenance point may be finely adjusted in a vertical direction in order to accelerate the maximum efficiency, maintain the maximum efficiency speed, and cut off the fuel according to kinds of the vehicles applying the system so that errors of the ¾ and ⅕ points of the engine load capacity are considered.

Preferably, the analog signal may be converted into the digital signal; the fuel-injection amount and a fuel-injection frequency may be detected by a fuel-injection amount-detecting unit; a vehicle speed signal or a travel distance signal outputted from a GPS (Global Positioning System) signal may be accepted; and information determining a state of the vehicle, such as a driving fuel efficiency, a driving time, and a driving distance, may be schematized by numerical values or a graph in the liquid crystal display unit.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the annexed drawings.

Figure 1:
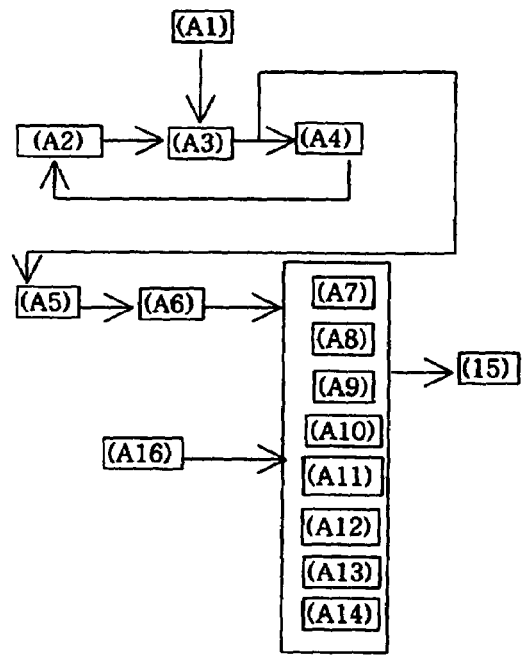
FIG. 1 is a block diagram illustrating a system for indicating, recording and evaluating a driving-data mode of a vehicle in accordance with the present invention.

FIG. 1 is a block diagram illustrating a system for indicating, recording and evaluating a driving-data mode of a vehicle in accordance with the present invention. An electronic control unit A3 instructs fuel-injection A4 according to road conditions and driver's manipulation A1. Engine load capacity A2 is generated according to a fuel-injection amount, and is transmitted to the electronic control unit A3. Then, the electronic control unit A3 computes the road condition and the driver's manipulation A1, thereby achieving the fuel-injection A4. The above-described procedure forms one cycle of the system of the present invention.

The road condition and the driver's manipulation A1 generate signals to various sensors, such as a throttle position sensor, a cam angle sensor, a cooling water temperature sensor, an oxygen sensor, an air flow sensor, etc. The electronic control unit A3 computes these signals, thereby instructing the fuel-injection A4.

Here, an analog signal A5 determining the fuel-injection amount is converted into a digital signal A6 and a fuel-injection amount-detecting unit A7 detects the digital signal A6. A maximum point-assigning unit A8 assigns the maximum point of the fuel-injection amount, an engine idle driving fuel-injection amount driving point-assigning unit A9 assigns a driving point having a fuel-injection amount for engine idle driving, a ¾ point-assigning unit A10 assigns a point to be ¾ of a distance from the driving point having the fuel-injection amount for engine idle driving to the maximum point of the fuel-injection amount, a ⅕ point-assigning unit A11 assigns a point to be ⅕ of the distance from the driving point having the fuel-injection amount for engine idle driving to the maximum point of the fuel-injection amount, a fuel-injection amount cutting point-assigning unit A12 assigns a point for cutting off the fuel-injection amount, a fuel-injection amount display indicating unit A13 indicates the display of the fuel-injection amount and records the display for a designated period, a fuel-injection amount graph-regulating unit A14 finely regulates a graph illustrating the fuel-injection amount, and a liquid crystal display unit A15 displays the obtained results and conducts the assignment A16 of variables of the-assigning units.

Figure 2:
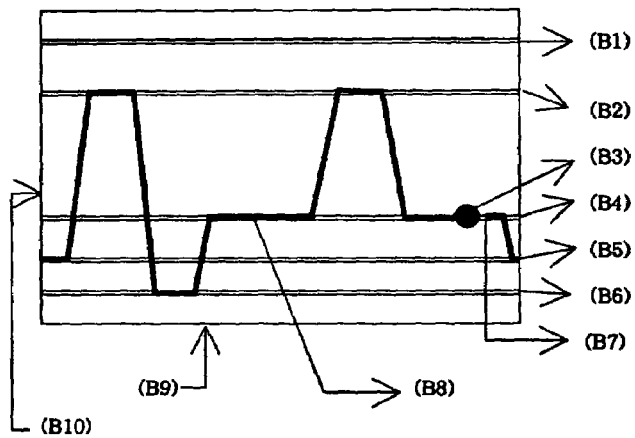
FIG. 2 is a schematic view of a liquid crystal display unit of the system for indicating, recording and evaluating the driving-data mode of the vehicle in accordance with the present invention.

FIG. 2 is a schematic view of a liquid crystal display unit of the system for indicating, recording and evaluating the driving-data mode of the vehicle in accordance with the present invention. The liquid crystal display unit A15 displays a standard point B1 (fixed) of the maximum fuel-injection amount, a ¾ point B2 (finely adjustable in a vertical direction), a point B3 for indicating the display of the fuel-injection amount and generating the record of the fuel-injection amount, a ⅕ point B4 (finely adjustable in a vertical direction), a standard point B5 (fixed) of the fuel-injection amount for the engine idle driving, a standard point B6 for cutting off the fuel injection, a point B7 for terminating the record of the fuel-injection amount, and a graph B8 for illustrating the record of the fuel-injection amount and evaluating the application of the record to the driving-data mode. In coordinates, an X-axis denotes the time B9 and an Y-axis denotes the fuel-injection amount B10.

Figure 3:
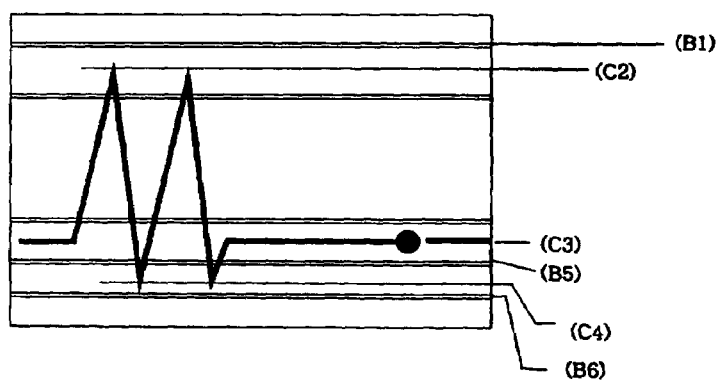
FIG. 3 is a schematic view illustrating a fuel-injection amount at the maximum point and a fuel-injection amount for engine idle driving, before they are regulated by a graph for illustrating the record of the fuel-injection amount and evaluating the application of the record to the driving-data mode in the liquid crystal display unit of the system for indicating, recording and evaluating the driving-data mode of the vehicle in accordance with the present invention.

FIG. 3 is a schematic view illustrating a fuel-injection amount at the maximum point and a fuel-injection amount for engine idle driving, before they are regulated by the graph for illustrating the record of the fuel-injection amount and evaluating the application of the record to the driving-data mode in the liquid crystal display unit of the system for indicating, recording and evaluating the driving-data mode of the vehicle in accordance with the present invention. An electronically controlled vehicle has a signal value for determining the fuel-injection amount, which is in the range of 1-6~5.5 ms in an engine idling state according to kinds of the vehicle, and in the range of 10~18 ms in the maximum fuel-injection amount according to kinds of the vehicle. In the graph B8, for illustrating the record of the fuel-injection amount and evaluating the application of the record to the driving mode, displayed by the liquid crystal display unit A15, the standard point B1 (fixed) of the maximum fuel-injection amount does not coincide with a point C2 of the maximum fuel-injection amount of the engine, and the standard point B5 (fixed) of the fuel-injection amount for the engine idle driving does not coincide with a point C3 of the fuel-injection amount for the engine idle driving.

The standard point B6 for cutting off the fuel injection has the value of zero coinciding with that of a point C4 for cutting off the fuel injection of the engine.

Figure 4:
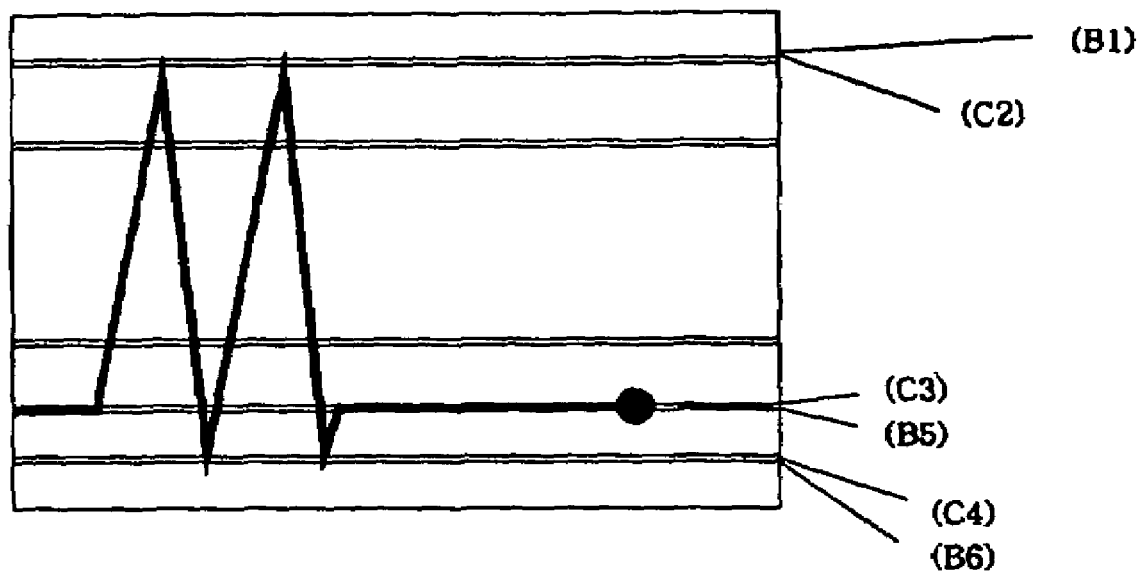
FIG. 4 is a schematic view illustrating the fuel-injection amount at the maximum point and the fuel-injection amount for engine idle driving, after they are regulated by the graph for illustrating the record of the fuel-injection amount and evaluating the application of the record to the driving-data mode in the liquid crystal display unit of the system for indicating, recording and evaluating the driving-data mode of the vehicle in accordance with the present invention.

FIG. 4 is schematic view illustrating the fuel-injection amount at the maximum point and the fuel-injection amount for engine idle driving, after they are regulated by the graph for illustrating the record of the fuel-injection amount and evaluating the application of the record to the driving mode in the liquid crystal display unit of the system for indicating, recording and evaluating the driving-data mode of the vehicle in accordance with the present invention. In the graph B8, for illustrating the record of the fuel-injection amount and evaluating the application of the record to the driving mode, displayed by the liquid crystal display unit A15, the standard point B1 (fixed) of the maximum fuel-injection amount coincides with the point C2 of the maximum fuel-injection amount of the engine, and the standard point B5 (fixed) of the fuel-injection amount for the engine idle driving coincides with the point C3 of the fuel-injection amount for the engine idle driving. Further, the standard point B6 for cutting off the fuel injection has the value of zero coinciding with that of the point C4 for cutting off the fuel injection of the engine. Accordingly, it is possible to precisely detect $\frac{3}{4}$ and $\frac{1}{5}$ load capacity of the engine and to precisely cut off the fuel injection.

Figure 5:
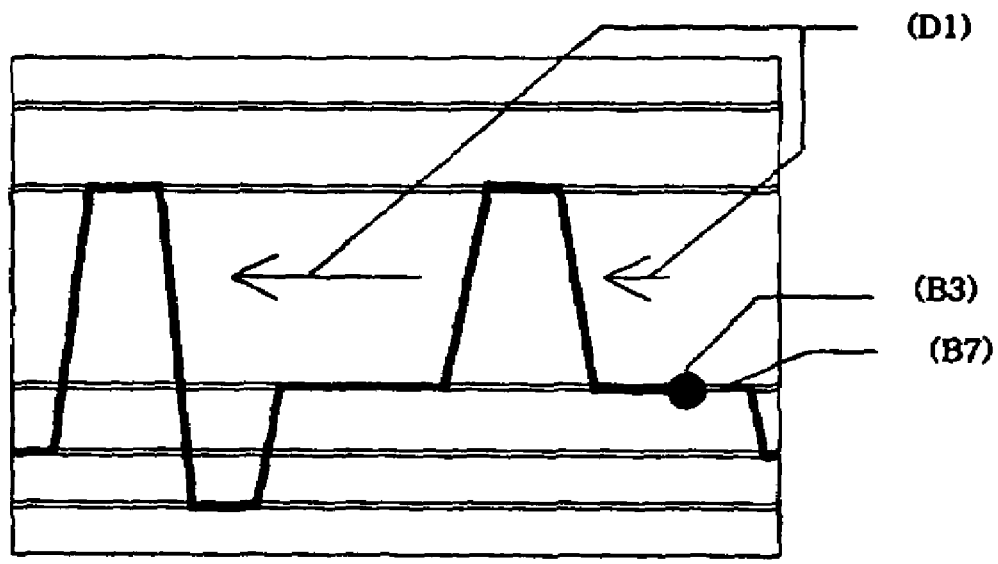
FIG. 5 is a schematic view illustrating generation, termination and shift of the graph for illustrating the record of the fuel-injection amount and evaluating the application of the record to the driving-data mode in the liquid crystal display unit of the system for indicating, recording and evaluating the driving-data mode of the vehicle in accordance with the present invention.

FIG. 5 is a schematic view illustrating generation, termination and shift of the graph for illustrating the record of the fuel-injection amount and evaluating the application of the record to the driving-data mode in the liquid crystal display unit of the system for indicating, recording and evaluating the driving-data mode of the vehicle in accordance with the present invention. The system of the present invention evaluates whether or not a driver applies a driving mode by indicating the fuel-injection amount, generated by starting the engine, in a coordinate direction at the point B3 for indicating the display of the fuel-injection amount and generating the record of the fuel-injection amount in the graph B8, for illustrating the record of the fuel-injection amount and evaluating the application of the record to the driving-data mode, displayed by the liquid crystal display unit A15, by schematizing the record of the fuel-injection amount along a shift direction D1 of the graph B8 for a designated period and by maintaining the record up to the point B7 for terminating the record of the fuel-injection amount. The system for indicating, recording and evaluating the driving-data mode of the vehicle allows the driver to apply the driving-data mode to the $\frac{3}{4}$ point B2 of the engine load capacity, the $\frac{1}{5}$ point B4 of engine load capacity, and the fuel-cutting point, thereby increasing a fuel consumption rate. Further, the system for indicating, recording and evaluating a driving-data mode of a vehicle serves to accelerate the maximum efficiency, maintain the maximum efficiency speed, and cut off the fuel by finely adjusting the $\frac{3}{4}$ point (B2) and the $\frac{1}{5}$ point (B4) of the liquid crystal display unit (A15) as an acceleration point and a speed maintenance point according to kinds of the vehicle applying the system so that errors of the $\frac{3}{4}$ point of the engine load capacity, which is the maximum efficiency point in designing the engine, and the $\frac{1}{5}$ point of the engine load capacity, which is the maximum efficiency point in driving the vehicle, are considered.

INDUSTRIAL APPLICABILITY

As apparent from the above description, the present invention provides a system for indicating, recording and evaluating a driving-data mode of a vehicle, in which information of a fuel consumption rate and the driving mode are analyzed and the analyzed results are provided to the driver in real time, thereby preventing the fuel from being unnecessarily wasted due to a non-standardized driving method. Further, the system compensates for a fuel-injection amount by means of learning and correcting functions of an electronic control unit, thus informing the driver of the trouble of the vehicle and preventing accidents.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A system for indicating, recording and evaluating a driving-data mode of a vehicle for fuel economy, comprising:
   a fuel-injection amount-detecting unit for detecting a digital signal converted from an analog signal determining a fuel-injection amount;
   a maximum point-assigning unit for assigning the maximum point of the fuel-injection amount;
   an engine idle driving fuel-injection amount driving point-assigning unit for assigning a driving point having a fuel-injection amount for engine idle driving;
   a $\frac{3}{4}$ point-assigning unit for assigning a point to be $\frac{3}{4}$ of a distance from the driving point having the fuel-injection amount for engine idle driving to the maximum point of the fuel-injection amount;
   a $\frac{1}{5}$ point-assigning unit for assigning a point to be $\frac{1}{5}$ of the distance from the driving point having the fuel-injection amount for engine idle driving to the maximum point of the fuel-injection amount;
   a fuel-injection amount cutting point-assigning unit for assigning a point for cutting off the fuel-injection amount;
   a fuel-injection amount display-indicating unit for indicating the display of the fuel-injection amount and recording the display for a designated period;
   a fuel-injection amount graph-regulating unit for finely regulating a graph illustrating the fuel-injection amount; and
   a liquid crystal display unit for displaying obtained results, wherein variables of the assigning units are set.

2. The system as set forth in claim 1, wherein the liquid crystal display unit displays:
   a fixed standard point of the maximum fuel-injection amount;
   a $\frac{3}{4}$ point, finely adjustable in a vertical direction;
   a point for indicating the display of the fuel-injection amount and generating the record of the fuel-injection amount;
   a $\frac{1}{5}$ point, finely adjustable in a vertical direction;
   a fixed standard point of the fuel-injection amount for engine idle driving;
   a standard point for cutting off the fuel injection;
   a point for terminating the record of the fuel-injection amount; and a graph for illustrating the record of the fuel-injection amount and evaluating the application of the record to a driving mode,
wherein coordinate axes of the graph denote the time and the fuel-injection amount.

3. The system as set forth in claim 2, wherein in the graph for illustrating the record of the fuel-injection amount and evaluating the application of the record to the driving mode, displayed by the liquid crystal display unit,
the fixed standard point of the maximum fuel-injection amount does not coincide with a point of the maximum fuel-injection amount of the engine;
the fixed standard point of the fuel-injection amount for the engine idle driving does not coincide with a point of the fuel-injection amount for the engine idle driving; and
the standard point for cutting off the fuel injection coincides with a point for cutting off the fuel injection of the engine.

4. The system as set forth in claim 3, wherein in the graph for illustrating the record of the fuel-injection amount and evaluating the application of the record to the driving mode, displayed by the liquid crystal display unit,
the fixed standard point of the maximum fuel-injection amount coincides with a point of the maximum fuel-injection amount of the engine;
the fixed standard point of the fuel-injection amount for the engine idle driving coincides with a point of the fuel-injection amount for the engine idle driving; and
the standard point for cutting off the fuel injection coincides with a point for cutting off the fuel injection of the engine so that the system precisely detects $3/4$ and $1/5$ load capacities of the engine and precisely cuts off the fuel.

5. The system as set forth in claim 2,
wherein it is evaluated whether or not the driving mode is applied by indicating the fuel-injection amount, generated by starting the engine, in a coordinate direction at the point for indicating the display of the fuel-injection amount and generating the record of the fuel-injection amount in the graph, for illustrating the record of the fuel-injection amount and evaluating the application of the record to the driving mode, displayed by the liquid crystal display unit, by schematizing the record of the fuel-injection amount along a shift direction of the graph for a designated period, and by maintaining the record up to the point for terminating the record of the fuel-injection amount.

6. The system as set forth in claim 4,
wherein the driving mode is applied to the $3/4$ point of the engine load capacity, the $1/5$ point of the engine load capacity, and the point for cutting off the fuel, thereby increasing efficiency in fuel consumption.

7. The system as set forth in claim 2,
wherein the $3/4$ point and the $1/5$ point of the liquid crystal display unit serving as an acceleration point and a speed maintenance point are finely adjusted in a vertical direction in order to accelerate the maximum efficiency, maintain the maximum efficiency speed, and cut off the fuel according to kinds of the vehicles applying the system so that errors of the $3/4$ and $1/5$ points of the engine load capacity are considered.

8. The system as set forth in claim 1, wherein:
the analog signal is converted into the digital signal;
the fuel-injection amount and a fuel-injection frequency are detected by a fuel-injection amount-detecting unit;
a vehicle speed signal or a travel distance signal outputted from a GPS (Global Positioning System) signal are accepted; and
information determining a state of the vehicle, such as a driving fuel efficiency, a driving time, and a driving distance, are schematized by numerical values or a graph in the liquid crystal display unit.

* * * * *